(12) United States Patent
Rutherford et al.

(10) Patent No.: US 7,316,497 B2
(45) Date of Patent: Jan. 8, 2008

(54) FLUORESCENT VOLUME LIGHT SOURCE

(75) Inventors: Todd S. Rutherford, Cincinnati, OH (US); R. Edward English, Jr., Cincinnati, OH (US)

(73) Assignee: 3M Innovative Properties Company, Saint Paul, MN (US)

( * ) Notice: Subject to any disclaimer, the term of this patent is extended or adjusted under 35 U.S.C. 154(b) by 108 days.

(21) Appl. No.: 11/092,284

(22) Filed: Mar. 29, 2005

(65) Prior Publication Data

US 2006/0227570 A1 Oct. 12, 2006

(51) Int. Cl.
*F21V 7/04* (2006.01)
(52) U.S. Cl. .............. 362/600; 362/231; 362/84; 362/628
(58) Field of Classification Search .......... 362/600, 362/231, 84, 629, 621, 622, 627
See application file for complete search history.

(56) References Cited

U.S. PATENT DOCUMENTS

| | | | |
|---|---|---|---|
| 3,317,738 A | 5/1967 | Piepenbrink et al. | |
| 4,110,123 A | 8/1978 | Goetzberger et al. | |
| 4,142,781 A | 3/1979 | Baur et al. | |
| 4,149,902 A | 4/1979 | Mauer et al. | |
| 4,173,495 A | 11/1979 | Rapp et al. | |
| 4,292,959 A | 10/1981 | Coburn | |
| 4,425,907 A | 1/1984 | Younghouse | |
| 4,488,074 A | 12/1984 | Marandet | |
| 5,793,456 A | 8/1998 | Broer et al. | |
| 5,816,238 A | 10/1998 | Burns et al. | |
| 5,882,774 A | 3/1999 | Jonza et al. | |
| 5,974,059 A | 10/1999 | Dawson | |
| 6,122,103 A | 9/2000 | Perkins et al. | |
| 6,134,258 A | 10/2000 | Tulloch et al. | |
| 6,172,668 B1 | 1/2001 | Baur | |
| 6,229,939 B1 | 5/2001 | Komine | |
| 6,351,069 B1 | 2/2002 | Lowery et al. | |
| 6,504,301 B1 | 1/2003 | Lowery | |
| 6,509,651 B1 | 1/2003 | Matsubara et al. | |
| 6,517,213 B1 * | 2/2003 | Fujita et al. ............... | 362/84 |
| 6,580,097 B1 | 6/2003 | Soules et al. | |
| 6,614,179 B1 | 9/2003 | Shimizu et al. | |

(Continued)

FOREIGN PATENT DOCUMENTS

DE 103 21 020 A1 12/2004

(Continued)

OTHER PUBLICATIONS

Reinberg, A.R., et al., "GaAs : Si LED Pumped Yb-Doped YAG Laser," *Applied Physics Letters*, vol. 19, No. 1, pp. 11-13 (Jul. 1, 1971).

(Continued)

*Primary Examiner*—Ali Alavi

(57) ABSTRACT

An illumination system, such as might be used for illuminating a projection system, includes at least a first source of incoherent light capable of generating light in a first wavelength range. The system also includes a body containing a fluorescent material that emits light in a second wavelength range, different from the first wavelength range, when illuminated by light in the first wavelength range. The body has an extraction area and at least some of the light at the second wavelength is internally reflected within the body to the extraction area.

51 Claims, 11 Drawing Sheets

U.S. PATENT DOCUMENTS

| | | | |
|---|---|---|---|
| 6,685,341 | B2* | 2/2004 | Ouderkirk et al. .......... 362/297 |
| 6,744,960 | B2* | 6/2004 | Pelka ........................ 385/130 |
| 6,769,773 | B1 | 8/2004 | Wu |
| 6,784,603 | B2 | 8/2004 | Pelka et al. |
| 6,869,206 | B2 | 3/2005 | Zimmerman et al. |
| 6,991,358 | B2* | 1/2006 | Kokogawa ................. 362/619 |
| 6,995,355 | B2* | 2/2006 | Rains et al. ................ 250/228 |
| 7,011,421 | B2 | 3/2006 | Hulse et al. |
| 7,030,419 | B2 | 4/2006 | Shin et al. |
| 7,108,416 | B1 | 9/2006 | Osawa |
| 2001/0055208 | A1* | 12/2001 | Kimura ...................... 362/260 |
| 2002/0159019 | A1 | 10/2002 | Pokorny et al. |
| 2003/0095401 | A1* | 5/2003 | Hanson et al. ................ 362/84 |
| 2004/0037538 | A1 | 2/2004 | Schardt et al. |
| 2004/0232812 | A1 | 11/2004 | Beeson et al. |
| 2004/0233664 | A1 | 11/2004 | Beeson et al. |
| 2004/0264185 | A1 | 12/2004 | Grotsch et al. |
| 2005/0135761 | A1 | 6/2005 | Cannon et al. |
| 2005/0146652 | A1* | 7/2005 | Yokoyama et al. ........... 349/61 |
| 2005/0174658 | A1 | 8/2005 | Long et al. |
| 2005/0286264 | A1* | 12/2005 | Kim et al. .................. 362/600 |
| 2006/0002131 | A1* | 1/2006 | Schultz et al. .............. 362/551 |

FOREIGN PATENT DOCUMENTS

| | | |
|---|---|---|
| JP | 03 266584 | 11/1991 |

OTHER PUBLICATIONS

Shurcliff, "Radiance amplification by Multi-stage fluorescence system" *J. Opt. Soc. Am.* vol. 41, No. 3, p. 209 (1951).

Garwin, "The Collection of Light from Scintillation Counters" *Rev. Sci. Insruments*, vol. 31, pp. 1010-0111, (1960).

Keil, Radiance amplication by a fluorescence radiation converter, *J. Appl. Phys.* vol. 40, No. 9, pp. 3544-3547 (1969).

Goetzberger, et al., "Solar Energy Conversion with Fluorescent Collectors" *Appl. Phys.* vol. 14, pp. 123-139 (1977).

Weber, et al. "Luminescent Greenhouse Collector for Solar Radiation" *Applied Optics*, vol. 15, No. 10, pp. 2299-2300 (1976).

Levitt et al., Materials for Luminescent greenhouse colar collectors *Applied Optics*, vol. 16, No. 10, pp. 2684-2689, (1977).

Mauer et al., Fluorscent Concentrator for Solar Energy Collection, *Research Disclosure*, vol. 129, p. 20, 1975.

Connor, U.S. Appl. No. 10/914,596, filed Aug. 9, 2004 entitled "Projection Display System Using Multiple Light Sources and Polarizing Element for Using with Same".

Conner, U.S. Appl. No. 10/895,705, filed Jul. 21, 2004 entitled "Projection System with Scrolling Color Illumination".

Goldberg, L. et al., "High efficiency 3 W side-pumped Yb fiber amplifier and laser," *Conference: Technical Digest*, Summaries of papers presented at the Conference on Lasers and Electro-Optics, Postconference Edition, CLEO '99, Conference on Lasers and Electro-Optics (IEEE Cat. No. 99CH37013), pp. 11-12.

Hideur, A., et al., "High-power double-clad Yb-doped fiber laser," *SPIE*, vol. 4751, (2002), pp. 510-520.

Jacobs, et al., Measurement of excited-state-absorption loss for $Ce^{3+}$ in $Y_3Al_5O_{12}$ and implications for tunable $5d \rightarrow 4f$ rare-earth lasers[a]), *Applied Physics Letters*, vol. 33, (1978) p. 410.

Rutherford, T.S. et al., "Yb:YAG and Nd:YAG edge-pumped slab lasers," *Optics Letters*, vol. 26, No. 13, (Jul. 1, 2001) pp. 986-988.

Steigerwald, D.A. et al., "Illumination with solid state lighting technology," IEEE *Journal of Selected Topics in Quantum Electronics*, vol. 8, No. 2, (Mar.-Apr. 2002) pp. 310-320.

* cited by examiner

US 7,316,497 B2

FLUORESCENT VOLUME LIGHT SOURCE

FIELD OF THE INVENTION

The invention relates to light sources, and particularly to light sources that might be used in illumination systems, for example projection systems.

BACKGROUND

The brightness of illumination sources based on a type of light source is typically limited by the brightness of the light source itself. For example, an illumination source that uses light emitting diodes (LEDs) typically has a brightness, measured in power per unit area per unit solid angle, the same as or less than that of the LEDs because the optics that collect the light from the LEDs will, at best, conserve the étendue of the LED source. Accordingly, the brightness of the illumination source is limited.

In some applications of illumination sources, such as projector illumination, illumination by LEDs is not a competitive option because the brightness of the LEDs that are currently available is too low. This is particularly a problem for the generation of green illumination light, a region of the visible spectrum where the semiconductor materials used in LEDs are less efficient at generating light.

Other types of light sources may be able to produce a sufficiently bright beam of light but they also suffer from other drawbacks. For example, a high-pressure mercury lamp is typically able to provide sufficient light for a projection system, but this type of lamp is relatively inefficient, requires a high voltage supply and has limited lifetime. Solid-state sources, such as LEDs are more efficient, operate at lower voltages, and are therefore safer, and have longer lifetimes than lamps, often extending to several tens of thousands of hours.

Therefore, there exists a need for a solid-state light source that can be used in illumination systems that is brighter than current light sources.

SUMMARY OF THE INVENTION

One particular embodiment of the invention is directed to an illumination system that includes at least a first source of incoherent light capable of generating light in a first wavelength range and a body containing a fluorescent material that emits light in a second wavelength range, different from the first wavelength range, when illuminated by light in the first wavelength range. The body has an extraction area and at least some of the light at the second wavelength is internally reflected within the body to the extraction area.

Another embodiment of the invention is directed to an illumination system that includes a body containing fluorescent material. The body has at least one pump area and a light extraction area. At least one light emitting diode (LED) is capable of generating light at a first wavelength. At least some of the light at the first wavelength passes through the at least one pump area into the body. Fluorescent light at a second wavelength is generated in the body by the light at the first wavelength. At least some of the light at the second wavelength is directed by the body towards the light extraction area. Light passing out of the light extraction area at the second wavelength has a higher brightness than the brightness of the first wavelength light passing in through the at least one pump area.

The above summary of the present invention is not intended to describe each illustrated embodiment or every implementation of the present invention. The following figures and the detailed description more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1A:
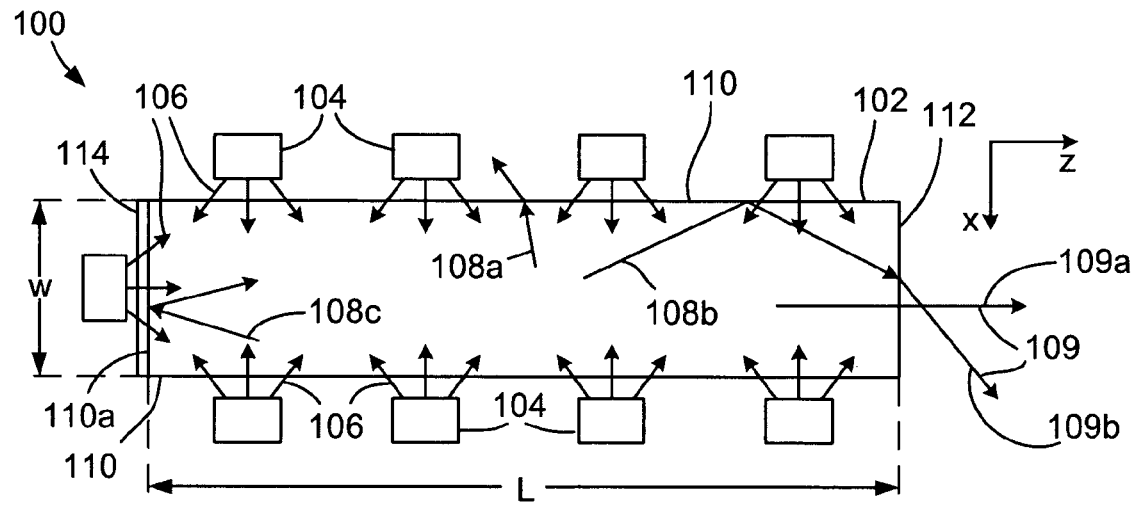
FIGS. 1A and 1B schematically illustrate an embodiment of a volume fluorescent light unit according to principles of the present invention.

Like numerals in different figures refer to similar elements. While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to light sources and is more particularly applicable to light sources that are used in illumination systems where a high level of brightness is required.

The brightness of a light source is measured in optical power (Watts) divided by the étendue. The étendue is the product of the area of the light beam at the light source times the square of the refractive index times the solid angle of the light beam. The étendue of the light is invariant, i.e. if the solid angle of the light beam is reduced without loss of the light, then the area of the beam must be increased, e.g. by increasing the emitting area of the light source. Since the étendue is invariant, the brightness of the light generated by the light source can only be increased by increasing the amount of light extracted from the light source. If the light source is operating at maximum output, then the brightness of that light source can no longer be increased.

The brightness of the light beam may be increased through the use of additional light sources. There are limits, however, as to how much the brightness of the light beam can be increased by simply adding more light sources. The optical system that directs the light beam to the target accepts light that is within certain aperture and cone angle limits only. These limits depend on various factors, such as the size of the lenses and the f-number of the optical system. The addition of more light sources does not provide an unlimited increase in the brightness of the light beam because, at higher numbers of light sources, an increasingly smaller fraction of the light from an added light source lies within the aperture and cone angle limits of the optical system.

The invention is believed to be useful for producing a concentrated light source, having a relatively high brightness, using a number of light sources that have a relatively lower brightness, such as light emitting diodes. The light from the lower brightness light sources is used to optically pump a volume of fluorescent material. The fluorescent material absorbs the light emitted by the low brightness light source and fluorescently emits light at a different wavelength. The fluorescent light is typically emitted isotropically by the fluorescent material. At least some of the fluorescent light can be directed within the volume to a light extraction area. The pump surface area is the area of the fluorescent volume that is used for coupling the relatively low brightness, short wavelength pump light into the volume, and the extraction area is that area of the fluorescent volume from which fluorescent light is extracted. A net increase in brightness can be achieved when the pump surface area is sufficiently large compared to the extraction area.

In the following description, the term fluorescence covers phenomena where a material absorbs light at a first wavelength and subsequently emits light at a second wavelength that is different from the first wavelength. The emitted light may be associated with a quantum mechanically allowed transition, or a quantum mechanically disallowed transition, the latter commonly being referred to as phosphorescence. If the fluorescent material absorbs only a single pump photon before emitting the fluorescent light, the fluorescent light typically has a longer wavelength than the pump light. In some fluorescent systems, however, more than one pump photon may be absorbed before the fluorescent light is emitted, in which case the emitted light may have a wavelength shorter than the pump light. Such a phenomenon is commonly referred to as upconversion fluorescence. In some other fluorescent systems, light is absorbed by an absorbing species in the fluorescent material and the resulting energy transferred to a second species in material nonradiatively, and the second species emits light. As used herein, the terms fluorescence and fluorescent light are intended to cover systems where the pump light energy is absorbed by one species and the energy is re-radiated by the same or by another species.

Figure 1B:
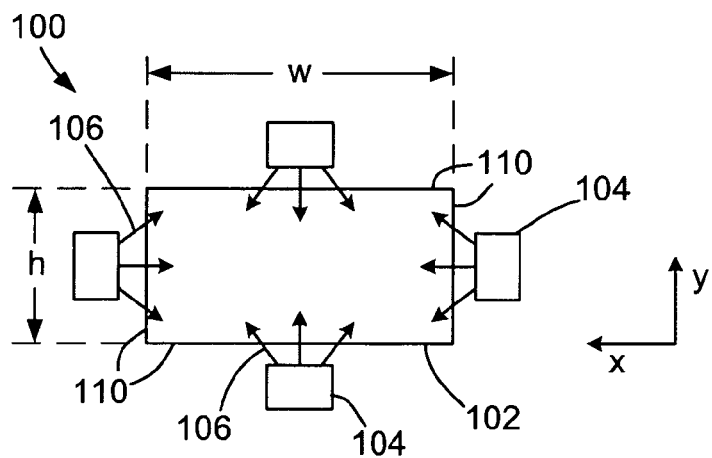

One particular embodiment of the invention is schematically illustrated in FIGS. 1A and 1B which show orthogonal views of a volume fluorescent light unit 100 that has a body 102 containing fluorescent material and a number of light emitters 104 that emit light 106 into the body 102.

The body 102 may be formed of any suitable material. For example, the body 102 may be formed of the fluorescent material itself, or may be formed of some dielectric material that is transparent to the fluorescent light and that contains the fluorescent material. Some suitable examples of dielectric material include inorganic crystals, glasses and polymer materials. Some examples of fluorescent materials that may be doped into the dielectric material include rare-earth ions, transition metal ions, organic dye molecules and phosphors. One suitable class of dielectric and fluorescent materials includes inorganic crystals doped with rare-earth ions, such as cerium-doped yttrium aluminum garnet (Ce:YAG) or doped with transition metal ions, such as chromium-doped sapphire or titanium-doped sapphire. Rare-earth and transition metal ions may also be doped into glasses.

Another suitable class of material includes a fluorescent dye doped into a polymer body. Many types of fluorescent dyes are available, for example from Sigma-Aldrich, St. Louis, Mo., and from Exciton Inc., Dayton, Ohio. Common types of fluorescent dye include fluorescein; rhodamines, such as Rhodamine 6G and Rhodamine B; and coumarins such as Coumarin 343 and Coumarin 6. The particular choice of dye depends on the desired wavelength range of the fluorescent light and the wavelength of the pump light. Many types of polymers are suitable as hosts for fluorescent dyes including, but not to limited to, polymethylmethacrylate and polyvinylalcohol.

Phosphors include particles of crystalline or ceramic material that include a fluorescent species. A phosphor is often included in a matrix, such as a polymer matrix. In some embodiments, the refractive index of the matrix may be substantially matched, within at least 0.02, to that of the phosphor so as to reduce scattering. In other embodiments, the phosphor may be provided as nanoparticles within the matrix: there is little scattering of light within the resulting matrix due to the small size of the particles, even if the refractive indices are not well matched.

Other types of fluorescent materials include doped semiconductor materials, for example doped II-VI semiconductor materials such as zinc selenide and zinc sulphide.

One example of an upconversion fluorescent material is a thulium-doped silicate glass, described in greater detail in co-owned U.S. Patent Publication No. 2004/0037538 A1, incorporated by reference. In this material, two, three or even four pump light photons are absorbed in a thulium ion ($Tm^{3+}$) to excite the ion to different excited states that subsequently fluoresce.

The particular selection of fluorescent material depends on the desired fluorescent wavelength and the wavelength of the light emitted from the light emitter. It is preferred that the fluorescent material absorb the pump light 106 emitted by the light emitter efficiently, so that the pump light 106 is mostly, if not all, absorbed within the body 102. This enhances the efficiency of converting pump light 106 to useful fluorescent output light 109. The particular examples of fluorescent species described above are presented for illustrative purposes only, and are not intended to be limiting.

The light emitters 104 may be any suitable type of device that emits incoherent light. The present invention is believed to be particularly useful for producing a relatively bright beam using light from less bright light emitters.

In preferred exemplary embodiments, the light 106 emitted from the light emitters 104 is in a wavelength range that overlaps well with an absorption of the fluorescent material. Also, it is useful if the light emitters 104 can be oriented so that there is a high degree of optical coupling of the emitted light 106 into the body 102. One suitable type of light emitter is the LED, which typically generates light 106 having a bandwidth in the range of about 20 nm to about 50 nm, although the light bandwidth may be outside this range. In addition, the radiation pattern from an LED is, in many cases, approximately Lambertian, and so relatively efficient coupling of the light 106 into the body 102 is possible. Other types of light emitter may also be used, for example a gas discharge lamp, a filament lamp and the like. Reflectors, or other optical elements such as refracting or diffracting elements, may be used to direct pump light to the body 102 that would otherwise not be directed to the body 102.

In this particular embodiment, the pump light enters the body 102 through pump surfaces 110 and the fluorescent output light 109 passes out the body 102 through an extraction face 112.

The fluorescent material in the body 102 emits fluorescent light 108. Some portions of the fluorescent light, exemplified by ray 108a, may be transmitted through a pump surface 110 of the body 102. Other portions of the fluorescent light, exemplified by ray 108b, are reflected within the body 102. For example, when the light 108b is incident at a pump surface 110 at an angle, measured relative to the normal to the surface 110, that is greater than the critical angle, the light 108a is totally internally reflected within the body 102.

The rear surface 110a may be provided with a reflective coating 114 that reflects fluorescent light, exemplified by ray 108c, incident thereon at an angle less than the critical angle. The reflective coating 114 may be any suitable type of coating that reflects fluorescent light incident at the rear surface 110a. For example, the reflective coating 114 may be a multilayer, inorganic dielectric coating or a polymer multilayer optical film (MOF) coating, or a metal coating. If the reflective coating 114 is a multilayer, inorganic dielectric coating or a MOF coating, then it may be possible to design the reflective coating 114 to pass pump light 106 and reflect fluorescent light 108c, thus allowing the body 102 to be pumped through the rear surface 110a. Metal coatings typically have a broad reflectivity spectrum that mitigates against pumping through the rear surface 110a. Where the reflective coating 114 is transparent to the pump light, it may be possible to pump the body 102 through the rear surface 110a.

Some of the fluorescent light that passes out of the body 102 through the extraction face 112, exemplified by light ray 109a, may pass directly out of the body 102 without reflection at any surface of the body 102. Other portions of the output fluorescent light 109, exemplified by light ray 109b, may have been reflected within the body 102.

A Cartesian co-ordinate system is provided in FIGS. 1A and 1B to aid in the description of the volume fluorescent light unit 100. The directions of the co-ordinate system have been arbitrarily assigned so that the output fluorescent light propagates generally along the z-direction, which is parallel to the long side of the body, having a length, L. The width of the body 102, w, is measured in the x-direction and the height of the body 102, h, is measured in the y-direction.

The body 102 may take on different shapes. In the illustrated exemplary embodiment, the body 102 has a rectangular cross-section, parallel to the x-y plane. In other exemplary embodiments, the cross-section of the body 102 may be different, for example, circular, triangular, elliptical, or polygonal, and may also be irregular.

An estimate of the brightness enhancement provided by the volume fluorescent light unit 100 may be obtained as follows. If it is assumed that the pump light 106 enters only the four major surfaces of the body 102, i.e. those surfaces defined by the length of the body, and the rear surface 110a remains unpumped, then the total pumped area is equal to $2L(w+h)$. Furthermore it is assumed that the pump light 106 is incident on the body 102 within a cone angle of 60°. The étendue, $E_{in}$, available for coupling the pump light 106 into the body is given, therefore, by:

$$E_{in}=2L(w+h)\cdot 2\pi\cdot(1-\cos^2 60°)=3\pi L(w+h). \quad (1)$$

The critical angle, $\theta_c$, for total internal reflection within the body 102 is given by $\theta_c=\sin^{-1}(1/n)$, where n is the refractive index of the body 102. If the body has a refractive index of 1.5, then $\theta_c=41.8°$. Therefore, only fluorescent light within a cone of $2\pi(1-\cos(41.8°))$ steradians is coupled out of the end face 112. The cone contains a fraction $F=(1-\cos(41.8°))=0.255$ of the total light emitted in the volume. If there is a reflector at the rear surface 110a, then 25.5% of the light should escape through a single end. Tilting the rear surface 110a, as described below, may increase the fraction of light coupled out of the end face 112 to 30%.

In the illustrated embodiment, the fluorescent light 109 emitted through the extraction face 112 is directed over a solid angle of $2\pi$ steradians. Thus, the étendue, $E_{out}$, of the fluorescent output light 109 from the extraction face 112 is given by:

$$E_{out}=2\pi wh, \quad (2)$$

so the étendue is increased by a factor, M, of $$M=E_{in}/E_{out}=(3/2)(L/w)\cdot(1+w/h) \quad (3)$$

The overall brightness at the fluorescent output is reduced by the optical power lost, $\eta$, that has the following components:

i) Fresnel transmission of pump light 106 into body, R;
ii) Stokes efficiency of fluorescence, S;
iii) Extraction of fluorescent light from body=0.3

The value of $\eta$ may be obtained by multiplying these three factors together. Taking reasonable estimates for R and S at 91% and 85% respectively, and using the value of 30% extraction efficiency, an estimated value for $\eta$ is 0.23. Therefore, the brightness of the output fluorescent light is enhanced over that of the input pump light 106 by a factor of:

$$M\eta=0.35(L/w)(1+w/h) \quad (4)$$

In an example where $L=5w$ and $w/h=16/9$, the brightness is increased, therefore, by a factor of 4.8. As is discussed below, various modifications to this basic embodiment of volume fluorescent light unit 100 may be made to increase the brightness enhancement.

It is important that only a small amount of fluorescent light within the body be scattered, in order to preserve the étendue enhancing properties of the volume fluorescent light unit. Therefore, it is preferred that the mean free path for fluorescent light in body itself, i.e. the average distance between bulk scattering events, be about 2L, or longer. Also, to reduce scattering loss when the light is internally reflected, it is preferred that the scatter per total internal reflection be less than about 5%/(2L/h).

Figure 2A:
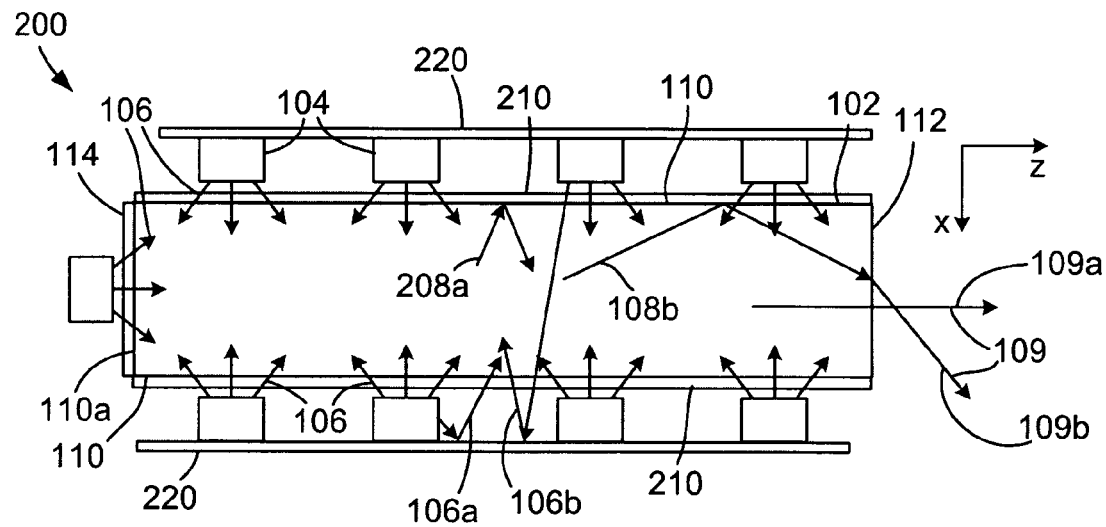
FIGS. 2A and 2B schematically illustrate other embodiments of volume fluorescent light units according to principles of the present invention.

In the exemplary embodiment of volume fluorescent light unit 200, schematically illustrated in FIG. 2A, the pump surfaces 110 of the body 102 are provided with reflective coatings 210 that transmit the pump light 106 but reflect the fluorescent light 108. The reflective coatings 210 may be multilayer inorganic dielectric coatings or MOF coatings. Using such coatings 210, light 208a that would otherwise be incident at the surface 110 at an angle less than the critical angle for total internal reflection within an uncoated body 102, is reflected so as to remain within the body 102. Thus, there is an increased likelihood that light 208a will be extracted through the extraction face 112, with the result that the amount of fluorescent light 109 exiting the extraction face is increased.

The light emitters 104 may optionally be provided on a substrate 220. For example, where the light emitters 104 are LEDs, then substrate 220 may make electrical and thermal connections to the LEDs for providing power and cooling respectively. The substrate 220 may be reflective so that some light, exemplified by light ray 106a, directed from the light emitter 104 in direction away from the body 102 may be redirected towards the body 102. In addition, the substrate 220 may reflect pump light that has passed through the body 102 without being absorbed, exemplified by light ray 106b.

Figure 2B:
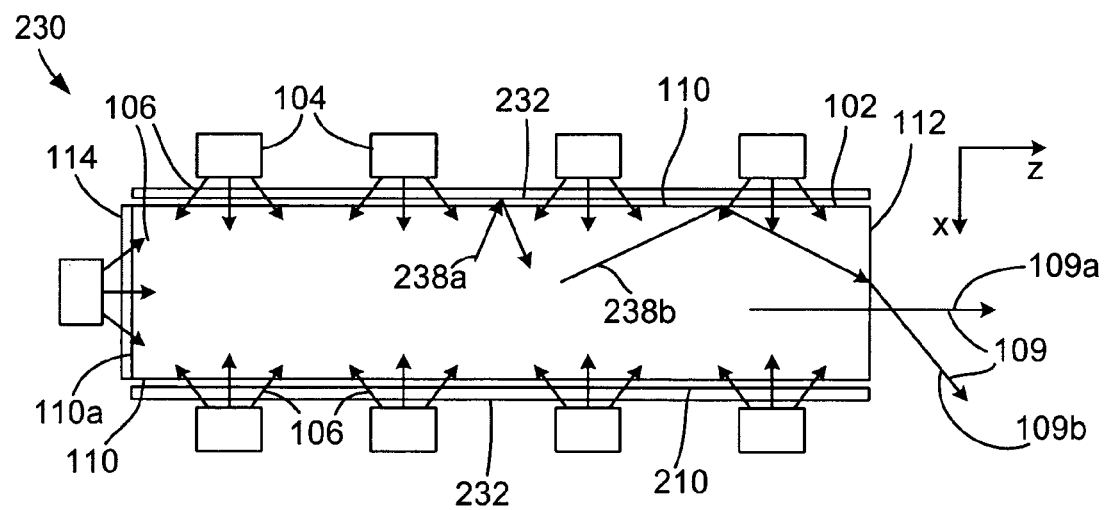

Another exemplary embodiment of a volume fluorescent light source 230 is schematically illustrated in FIG. 2B. In this embodiment, a low pass filter 232 is disposed between the light emitters 104 and the body 102. The low pass filter 232 may be, for example, a multilayer dielectric reflector having a cut-off at a wavelength between the wavelength of the pump light 106 and the wavelength of the fluorescent light 109. Thus, the low pass filter 232 transmits the pump light, but reflects the fluorescent light. In some embodiments, the low pass filter 232 may be on the body surfaces 110. In other embodiments, the low pass filter 232 may be separated from the body 102 so that some light, exemplified by light ray 238b, incident at the surface of the body 102 at a sufficiently high angle, is totally internally reflected within the body 102. Some other light, exemplified by light ray 238a, is incident at the surface of the body 102 at an angle less than the critical angle and is transmitted through the surface 110 but is reflected by the low pass filter 232 back into the body 102.

Figure 3:
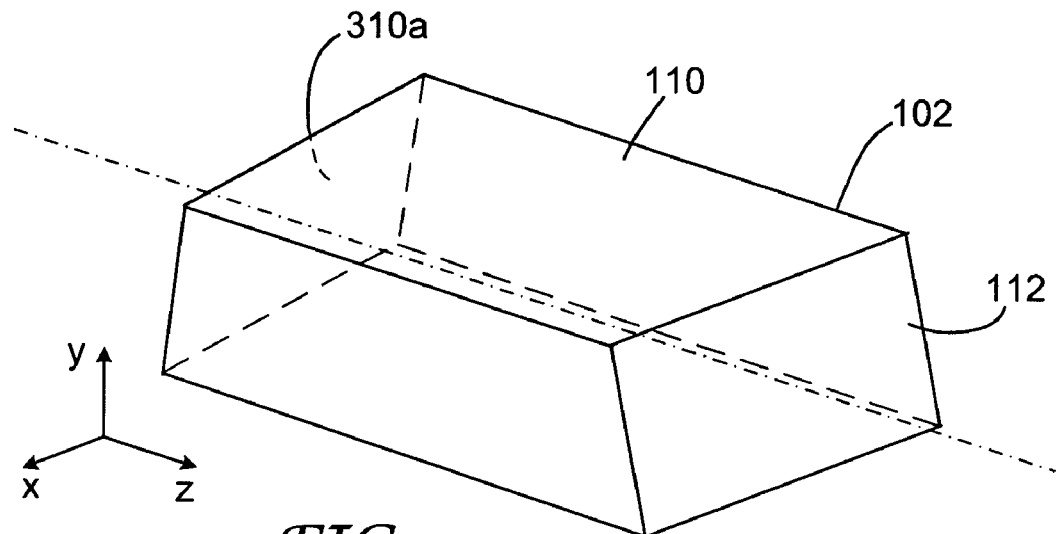
FIG. 3 schematically illustrates an embodiment of a fluorescent body with a tilted rear surface, according to principles of the present invention.

An embodiment of the body 102 is schematically illustrated in FIG. 3, in which the rear surface 310a is tilted so as not to be at right angles to the other pump surfaces 110, i.e. the rear surface 310a is not orthogonal to the side walls of the body. The titled rear surface 310 is tilted so as not to be parallel to either the x-axis or the y-axis. The amount of tilt may be, for example about 5°. The tilt increases the amount of light extractable from the body 102. Multiple reflections of the fluorescent light 108 from the tilted end face 310a cause fluorescent light, which might otherwise circulate within the body through repeated total internal reflection (TIR), to walk off from the TIR condition. Thus, the light becomes incident at the extraction surface 112 at an angle less than the critical angle and is transmitted as output fluorescent light 109. Ray tracing shows that, with a tilted rear surface 310a, up to 30% of the light can be extracted from the extraction surface 112 in the example discussed above where the body has a refractive index, n, of 1.5.

The extraction surface 112 may be provided with an anti-reflection coating to reduce reflective losses to fluorescent light transmitted through the extraction surface 112. This does not, however, prevent the possibility that the fluorescent light is incident at the extraction surface at a sufficiently high angle to be totally internally reflected.

The extraction surface 112 may be, but is not required to be, perpendicular to the pump surfaces 110. For example, the extraction surface 112 may be tilted so as not to be parallel to the x-y plane, as illustrated. One result of tilting the extraction surface 112 is that, where the extraction surface 112 is imaged by an image relay system, the resulting image plane is also titled. This may be useful if the light from the body is being imaged to a tilted target. This is discussed in greater detail in U.S. patent application Ser. No. 10/744,994, incorporated herein by reference.

Figure 4A:
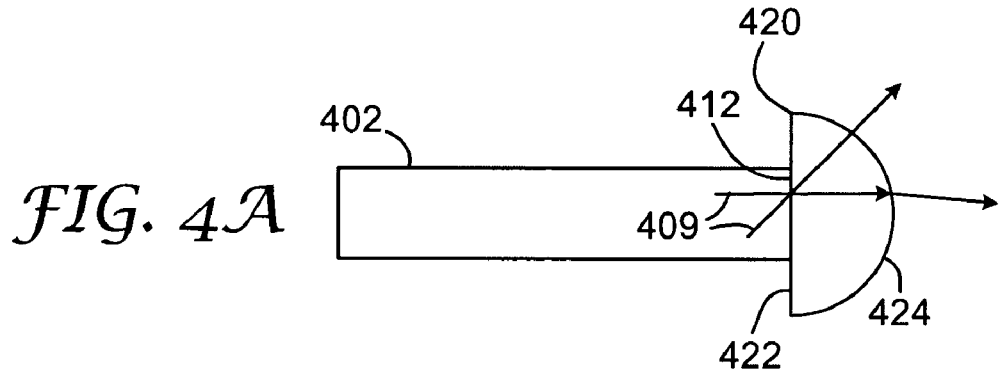
FIGS. 4A-4D schematically illustrate embodiments of fluorescent bodies with light output extractors according to principles of the present invention.

A light output extractor may be provided at the extraction face to reduce the amount of fluorescent light that is totally internally reflected at the extraction face. Different types of output extractors may be used. In one such approach, schematically illustrated in FIG. 4A, a lens 420 is coupled to the extraction face 412 of the fluorescent body 402 for use as an output extractor. The lens 420 has a rear surface 422 shaped to closely couple to the extraction face 412. Preferably, both the rear surface 422 and the extraction face 412 are flat. If the rear surface 422 and the extraction face 412 are sufficiently matched in shape, then light can be efficiently coupled from the body 402 into the lens 420 by placing the rear surface 422 against, or within less than one wavelength of, the extraction face 412. An index matching material, for example an index matching oil or an optical adhesive, may also be used between the extraction face 412 and the rear surface 422. The index matching material preferably has a refractive index whose value lies between the refractive indices of the body 402 and the lens 420, but this is not a requirement.

The lens 420 may be hemispherical, as shown, or may be a simple plano-convex lens. If the lens 420 is not hemispherical, however, it is advantageous to ensure that the radius of curvature of the curved surface 424 is not so long that some of the light 409 from the body is incident at the curved surface at an angle greater than the critical angle. This maintains a high fluorescent output power. The refractive power of the lens 420 may be used to reduce the angular spread of the fluorescent light 409 output from the lens 420 compared to the angular spread of the light 409 as it enters the lens 420 from the body 402.

Figure 4B:
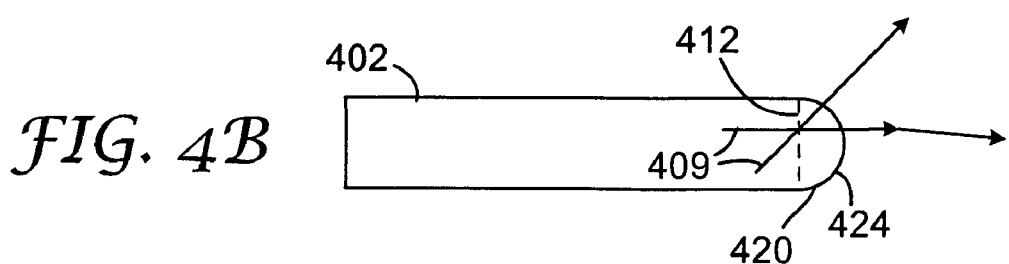

The lens 420 may also be formed integrally with the body 402, for example the body 402 and the lens 420 may be molded from a single piece of material, for example as shown in FIG. 4B. Thus, the lens 420 may contain fluorescent material, although the fluorescent material in the lens 420 need not be pumped with light from a light emitter. Where the body 402 is formed integrally with the lens 420, the extraction face 412 may be considered to be that area of the interface between the pumped region and the unpumped region of the material forming the integrated body/lens.

Figure 4C:
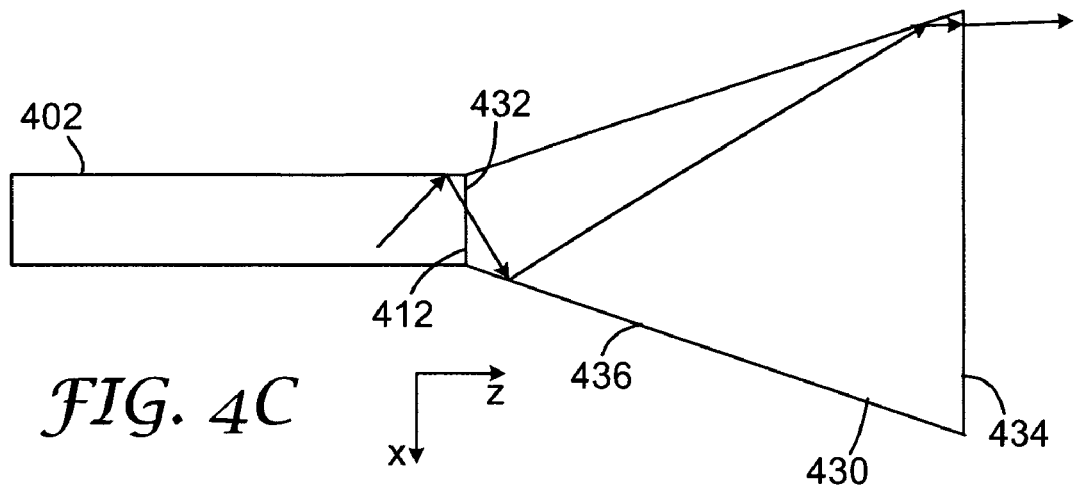

In another approach to extracting the fluorescent light from the body 402, schematically illustrated in FIG. 4C, a tapered, transmissive tunnel 430 is coupled to the extraction face 412 of the fluorescent body 402 for use as an output extractor. The tunnel 430 has a rear surface 432 shaped to closely couple to the extraction face 412 of the body 402. Preferably, both the rear surface 432 and the extraction face 412 are flat. If the rear surface 432 and the extraction face 412 are sufficiently matched, then light can be efficiently coupled from the body 402 into the tunnel 430 by placing the rear surface 432 against, or within less than one wavelength of, the extraction face 412. An index matching material, for example an index matching oil or an optical adhesive, may also be used between the extraction face 412 and the rear surface 432. The tunnel 430 may be made of any suitable transparent material, for example a glass or a polymer.

The tunnel 430 has a tapered cross-sectional area that increases towards its output end 434. The tunnel walls 436 may be flat, as illustrated, or may be curved. The cross-sectional area (in the x-y plane) can increase in just one dimension, or in two. Reflection of fluorescent light 409 at the tunnel walls 436 tends to direct the fluorescent light 409 along the z-direction, and so the angular spread of the fluorescent light at the output 434 of the tunnel is less than the angular spread of the light as it enters the tunnel 430 from the body. The reduced angular spread reduces the amount of fluorescent light 409 that is totally internally reflected at the output surface 434. The output surface 434 may be flat, as illustrated, or may be curved.

Within the tunnel 430 the fluorescent light may be totally internally reflected at the walls 436, or the walls 436 may be provided with a reflective coating, for example an inorganic dielectric stack or a polymer MOF reflective coating.

The tunnel 430 may also be formed integrally with the body 402, for example the body 402 and the lens tunnel 430 may be molded from a single piece of material, such as polymer material. Thus, the tunnel 430 may contain fluorescent material. The fluorescent material in the tunnel 430 may be pumped by light from one or more emitters that direct pump light through the walls 436 of the tunnel 430. On the other hand, the tunnel 430 need not be pumped. Where the body 402 is formed integrally with the tunnel 430, the extraction face 412 may be considered to be that area of the interface between the pumped region and the unpumped region of the material forming the integrated body/tunnel.

Figure 4D:
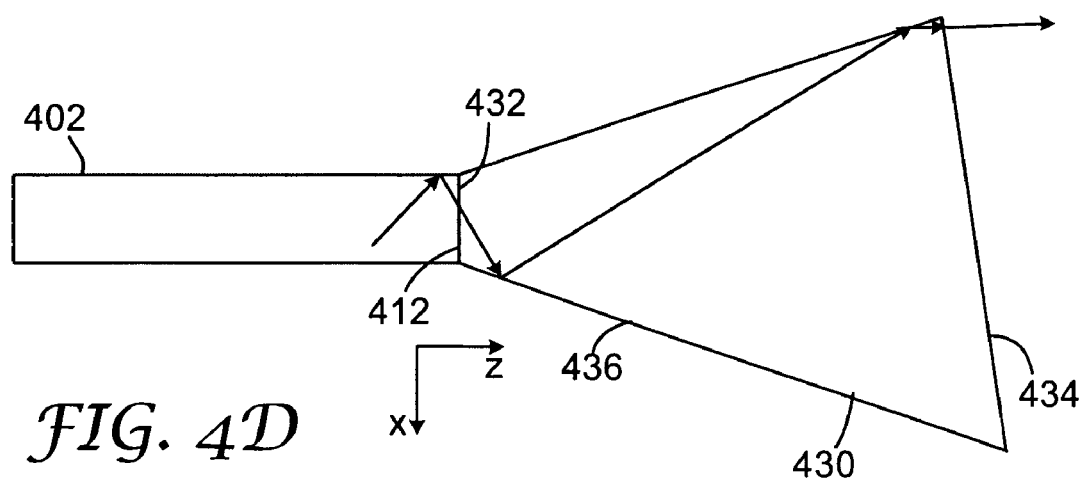

The output surface 434 of the tunnel 430 may be perpendicular to the z-axis, or may be tilted, for example as is schematically illustrated in FIG. 4D and is further described in U.S. patent application Ser. No. 10/744,994. A tilted output surface 434 may be useful, for example, where the output surface is being imaged by an image relay system to a tilted target. One example of a tilted target is a digital multimirror device (DMD), an example of which is supplied by Texas Instruments, Plano, Tex., as the DLPT™ imager. A DMD has many mirrors positioned in a plane, each mirror being individually addressable to tilt between two positions. The DMD is typically illuminated by a light beam that is non-normal to the DMD mirror plane, i.e. is tilted relative to the direction of propagation of the illumination light, and the image light reflected by the DMD is reflected in a direction normal to the mirror plane.

Figure 5A:
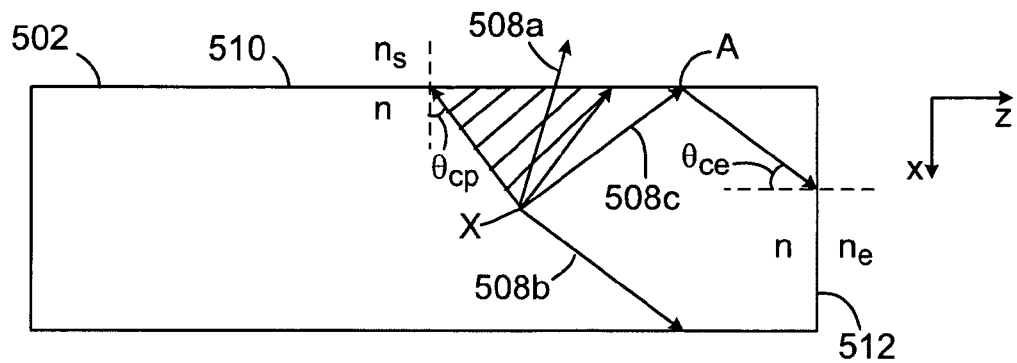
FIG. 5A schematically illustrates total internal reflection within a fluorescent body of a volume fluorescent light unit according to principles of the present invention.

It is useful to consider the ranges of angles for which light generated within the fluorescent body is either reflected within the body or escapes from the body. Referring now to FIG. 5A, which schematically illustrates a fluorescent body 502 having a pump face 510 and a light extraction face 512, we consider light that is fluorescently generated at point X. If the light, for example ray 508a, is incident at the pump face 510 at an angle less than the critical angle, $\theta_{cp}$, then the light 508a is transmitted through the pump face 510 and is lost. The critical angle at the pump face 510, $\theta_{cp}$, can be calculated from the expression:

$$\theta_{cp} = \sin^{-1}(n_p/n), \quad (5)$$

where $n_p$ is the refractive index on the outside of the pump face and n is the refractive index of the body 502. The hatched region shows the range of angles that are less than $\theta_{cp}$. If the pump face 510 is in air, the value of $n_p$ is approximately equal to 1.

If the light propagating from point X, for example, light ray 508b, lies outside the cone indicated by the shaded region, then the light 508b is totally internally reflected by the pump face 510. Thus, in order to reduce the amount of light lost through the pump face, i.e. reduce $\theta_{cp}$, it is generally preferred that the value of n is larger.

The critical angle at the extraction face 512, $\theta_{ce}$, is given by:

$$\theta_{ce} = \sin^{-1}(n_e/n), \quad (6)$$

where $n_e$ is the refractive index of the material outside the extraction face 512. This may be air or in some embodiments may be some other value, for example the embodiments illustrated in FIGS. 4A and 4B. It is desirable, in this case, for $\theta_{ce}$ to be large, so that a higher faction of light propagates through the extraction face 512 without being totally internally reflected.

The ray 508c represents a light ray originating at point X and propagating in the x-z plane that, if reflected by the pump surface 510 at point A, is incident at the extraction face 512 at the critical angle, $\theta_{ce}$. As the value of $\theta_{ce}$ increases, the position of point A moves to the left, in the negative z direction. At some value of $\theta_{ce}$, the point A enters the hatched area, i.e. instead of being totally internally reflected by the pump face 510, the light ray is transmitted through the pump surface 510. Accordingly, the increase in light output coupling efficiency drops when the value of $\theta_{ce}$ becomes greater than that which puts point A at a point on the pump face 510 where the angle of incidence from point X is less than $\theta_{cp}$. Where the pump face 510 and the extraction face 512 are at 90° to each other, this condition is met by the value of $\theta_{ce}$ being no greater than $90°-\theta_{cp}$. Therefore, if $n_p=1$ and n is known, it can be calculated that, at least for light propagating parallel or close to parallel to the x-z plane, maximum outcoupling efficiency for the fluorescent light is obtained where $n_{ce}=n.\sin(90°-\theta_{cp})$. This indicates that the extraction efficiency for fluorescent light from the body 502 may level off as the refractive index of the output extractor approaches the value of refractive index of the body 502. Maximum outcoupling efficiency may occur at higher values of $\theta_{ce}$ for light that propagates non-parallel to the x=z plane, but in general the increase in the outcoupling efficiency becomes smaller at the higher values of $\theta_{ce}$.

Figure 5B:
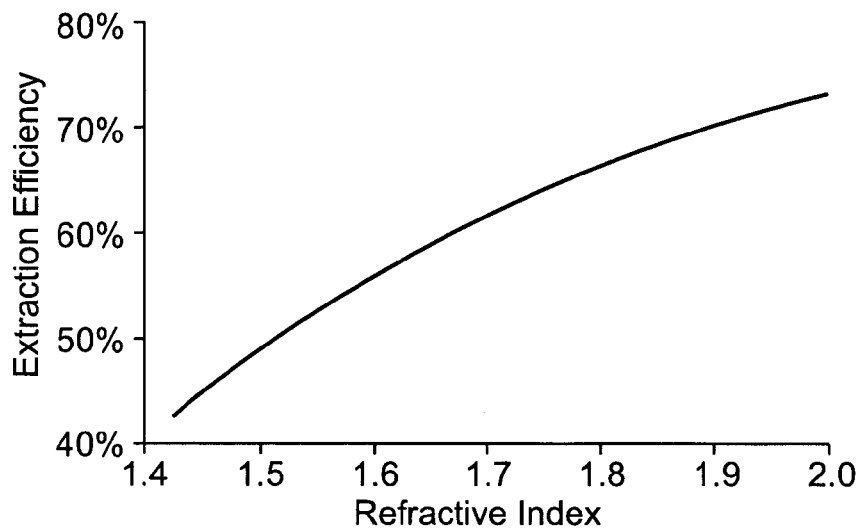
FIG. 5B presents a graph showing the calculated geometrical light collection efficiency as a function of the refractive index of the fluorescent body in a volume fluorescent light unit according to principles of the present invention.

The maximum efficiency for coupling fluorescent light out of a body using total internal reflection may be calculated. As discussed above, generally it is preferred that the body has a higher refractive index, so that a greater fraction of the fluorescent light is totally internally reflected within the body. FIG. 5B shows a graph of the maximum extraction efficiency, using an optimized output extractor, from a fluorescent body as a function of refractive index. At a refractive index value of n=1.5, the extraction efficiency is almost 50%, and at a value of n=1.9 is 70%.

Figure 6:
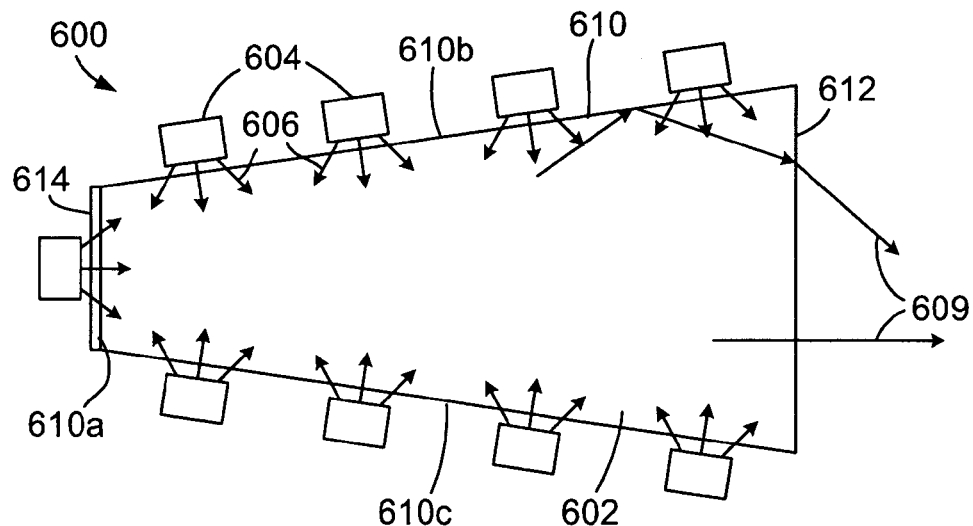
FIG. 6 schematically illustrates an embodiment of another volume fluorescent light unit according to principles of the present invention.

Another embodiment of volume fluorescent light unit 600 is schematically illustrated in FIG. 6. In this embodiment, the fluorescent body 602, pumped through pump faces 610 with pump light 606 from one or more light emitters 604, has a rear face 610a that has a smaller area than the extraction face 612. Accordingly, opposite pump faces 610b and 610c are not parallel. The pump faces 610 may be straight, as illustrated, or may be curved. In some exemplary embodiments, the body 602 may take on a tapered shape, as illustrated. The rear face 610a may optionally be provided with a reflecting layer 614. One consequence of the extraction face 612 being larger in area than the rear face 610a is that the angular spread of the fluorescent light at the extraction face 612 may be reduced, thus enabling a greater fraction of the fluorescent light 609 to escape from the body 602.

Figure 7A:
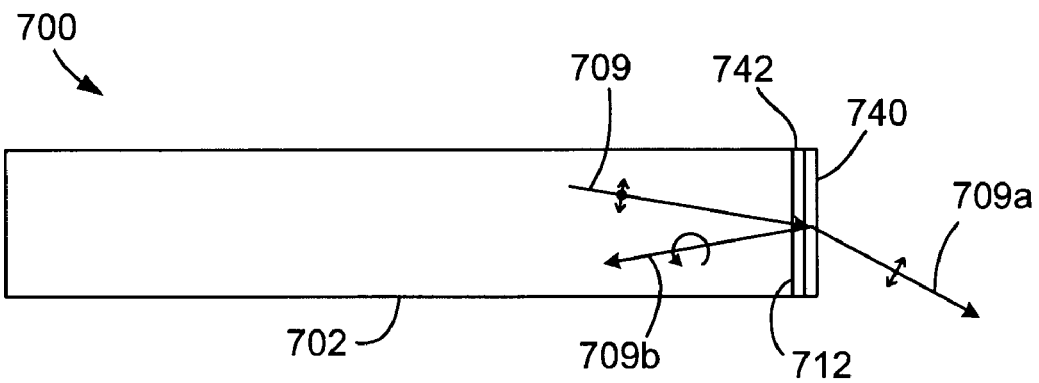
FIGS. 7A-7C schematically illustrate embodiments of polarized volume fluorescent light units, according to principles of the present invention.

In some exemplary embodiments of the invention, the fluorescent light from the volume fluorescent light unit may be at least partially polarized. A first exemplary embodiment of a polarized volume fluorescent light unit 700 is schematically illustrated in FIG. 7A. In this embodiment, a fluorescent body 702 is provided with a reflective polarizer 740 close to, or attached to, the extraction face 712. When unpolarized fluorescent light 709 is incident at the reflective polarizer 740, light in one polarization state 709a is substantially transmitted while light in the orthogonal polarization state is substantially reflected back to the body 702.

A polarization conversion element 742 may optionally be positioned between the polarizer 740 and the extraction face 712. Examples of polarization conversion elements include birefringent retarding elements and Faraday rotating elements. The polarization conversion element may be, for example, a quarter-wave retarding element. Light 709b that is reflected by the reflective polarizer 740 and passed through the polarization conversion element 742 propagates within the body 702 in a polarization state that is converted from that of the light reflected by the polarizer 740. The polarization state of the light 709b may be, for example, circularly polarized if the polarization conversion element 742 is a quarter-wave retarder. The light 709b may recirculate through the body 702 and propagate once more through the polarization conversion element 742 to the reflective polarizer 740. The polarization state of the recirculated light is different from its previous incidence at the reflective polarizer 740 because it has double-passed through the polarization conversion element 742, and so a fraction of the light originally in the polarization state that was reflected by the polarizer 740 may return to the polarizer 740 in the polarization state that is transmitted. Thus, the reflected fluorescent light 709b may be re-cycled for subsequent extraction from the light unit 700, increasing the overall extraction efficiency of the polarized light.

Any suitable type of reflective polarizer 740 may be used, for example, multilayer optical film (MOF) reflective polarizers; wire grid reflective polarizers or cholesteric reflective polarizers. MOF reflective polarizers rely on the difference in refractive index between at least two materials, usually polymeric materials, to selectively reflect light of one polarization state while transmitting light in an orthogonal polarization state. Some examples of MOF reflective polarizers are described in co-owned U.S. Pat. No. 5,882,774, incorporated herein by reference.

Some examples of wire grid polarizers useful in connection with the present invention include those described in U.S. Pat. No. 6,122,103. Wire grid polarizers are commercially available from, inter alia, Moxtek Inc., Orem, Utah.

Some examples of cholesteric polarizer useful in connection with the present invention include those described in, for example, U.S. Pat. No. 5,793,456, and U.S. Patent Publication No. 2002/0159019. Cholesteric polarizers are often provided along with a quarter wave retarding layer on the output side, so that the light transmitted through the cholesteric polarizer is converted to linear polarization.

Figure 7B:
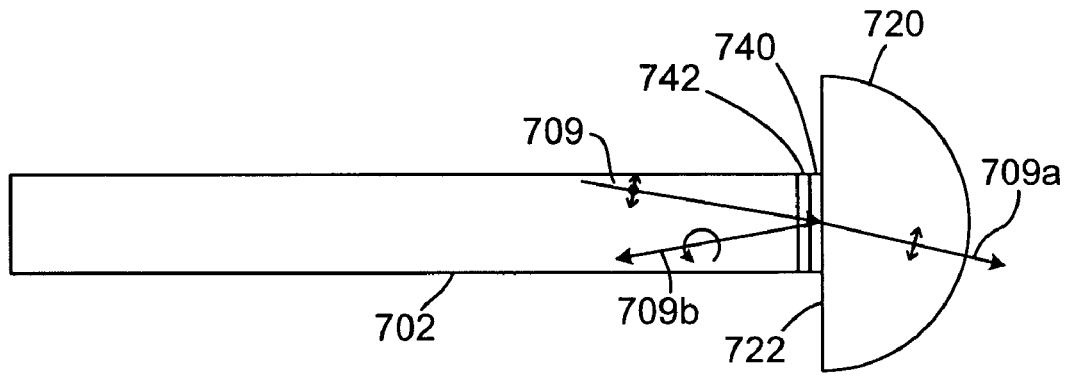

A substantially polarized output may be obtained from other embodiments of volume fluorescent light unit. For example, the volume fluorescent light unit schematically illustrated in FIG. 7B has a reflective polarizer 740 and polarization conversion element 742 positioned between the fluorescent body and the rear surface 722 of a lens 720.

Figure 7C:
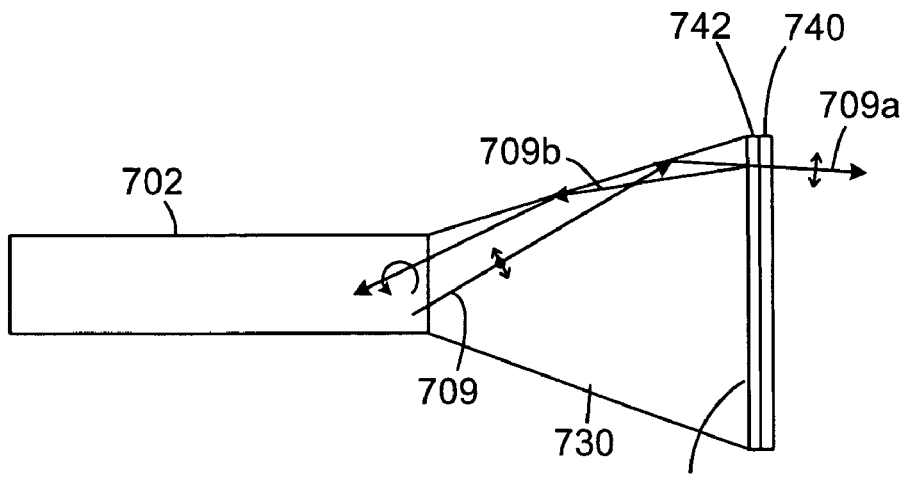

In another exemplary embodiment, schematically illustrated in FIG. 7C, the body is provided with a tunnel output extractor 730. The reflective polarizer 740 and optional polarization conversion element 742 may be positioned at the output of the tunnel output extractor 730, as illustrated, or may be positioned between the body and the tunnel output extractor 730. In some cases, the reflective polarizer 740 may be more effective at polarizing the incident light when the angular spread of the incident light is reduced, and so the degree of polarization of the output light 709a may be higher when the polarizer 740 is positioned at the output of the tunnel output extractor 730 compared to the position between the body 702 and the output extractor 730.

Figure 8A:
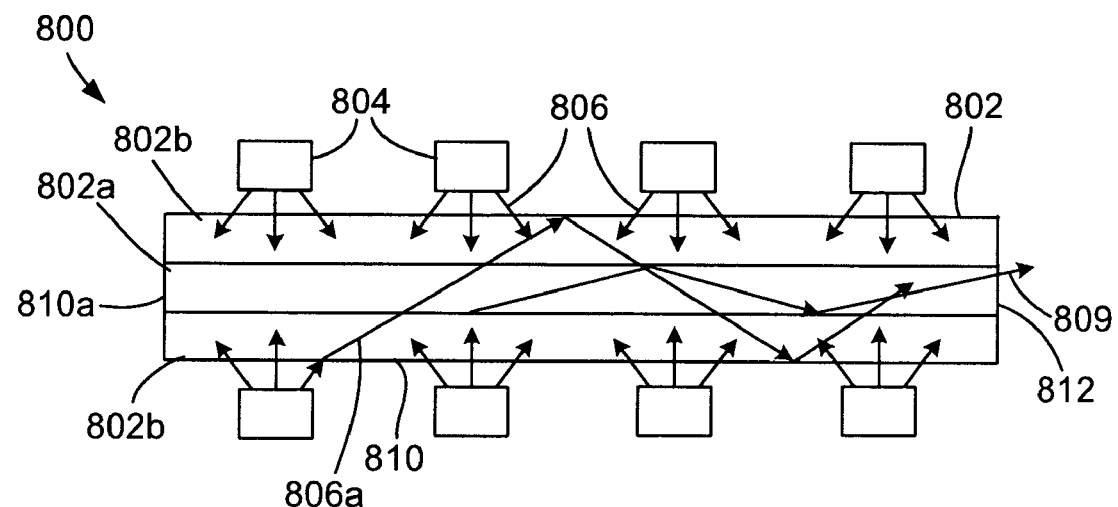
FIGS. 8A and 8B schematically illustrate waveguiding embodiments of volume fluorescent light units, according to principles of the present invention.

In some embodiments, the fluorescent material may be contained within a waveguide that guides the emitted fluorescent light. One exemplary embodiment of a volume fluorescent light unit 800 that contains a waveguide is schematically illustrated in FIG. 8A. In this embodiment, the unit 800 includes a body 802 that has a waveguiding core 802a that contains the fluorescent light. The core 802a is surrounded by a cladding 802b that has a lower refractive index than the core 802a. Thus, fluorescent light 809 generated within the numerical aperture of the core is guided to the extraction end 812. The core 802a may provide optical confinement in two dimensions, for example as is the case with a fiber or a buried waveguide, or may provide optical confinement in only one dimension, for example as with a planar waveguide.

In this particular embodiment, the light emitters 804 direct pump light 806 transversely into the fluorescent core 802a. The efficiency of pumping the fluorescent material in this arrangement may be low, unless the concentration of the fluorescent material in the core 802a is sufficiently high to absorb most of the pump light in as it passes through the core 802a. The rear face 810a may be provided with a reflective coating.

In some embodiments, a scattering mechanism may be provided to scatter at least some of the pump light 806a into a direction within the body 802 in which the pump light 806a is totally internally reflected within the body 802. For example, the pump surface 810 may be a scattering surface, or the cladding 802b may be provided with scatterers. Such an arrangement may permit the pump light to pass through the fluorescent core 802a multiple times.

Figure 8B:
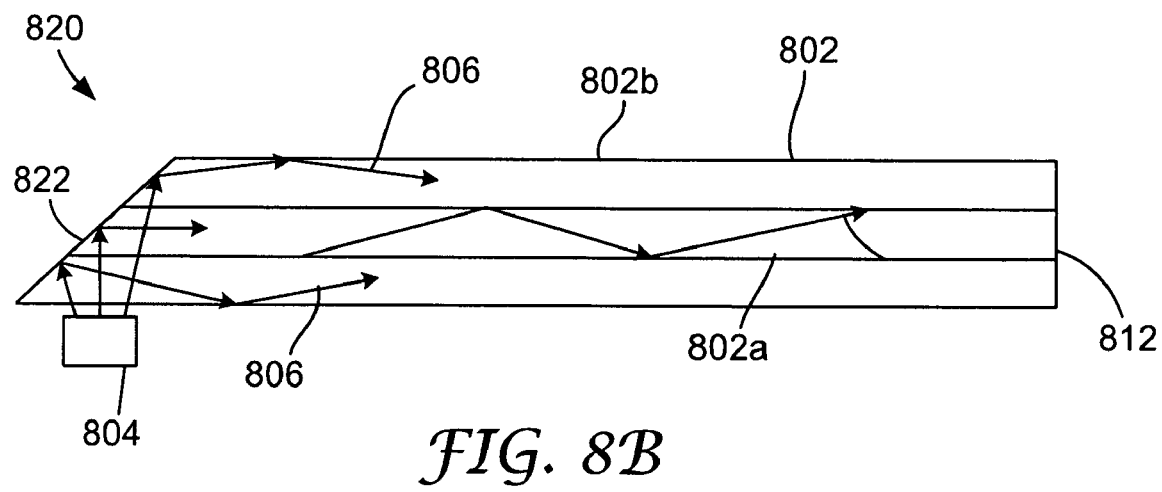

In another embodiment of waveguide volume fluorescent light unit 820, schematically illustrated in FIG. 8B, a light emitter 804 directs pump light 806 to an angled face 822 that directs light along the body 802. The cladding 802b internally reflects the pump light 806, so that the pump light 806 can make multiple passes through the fluorescent core 802a, effectively making a longer path length within the core 802a, resulting in increased absorption of the pump light 806 by the fluorescent material in the core 802a.

Figure 9:
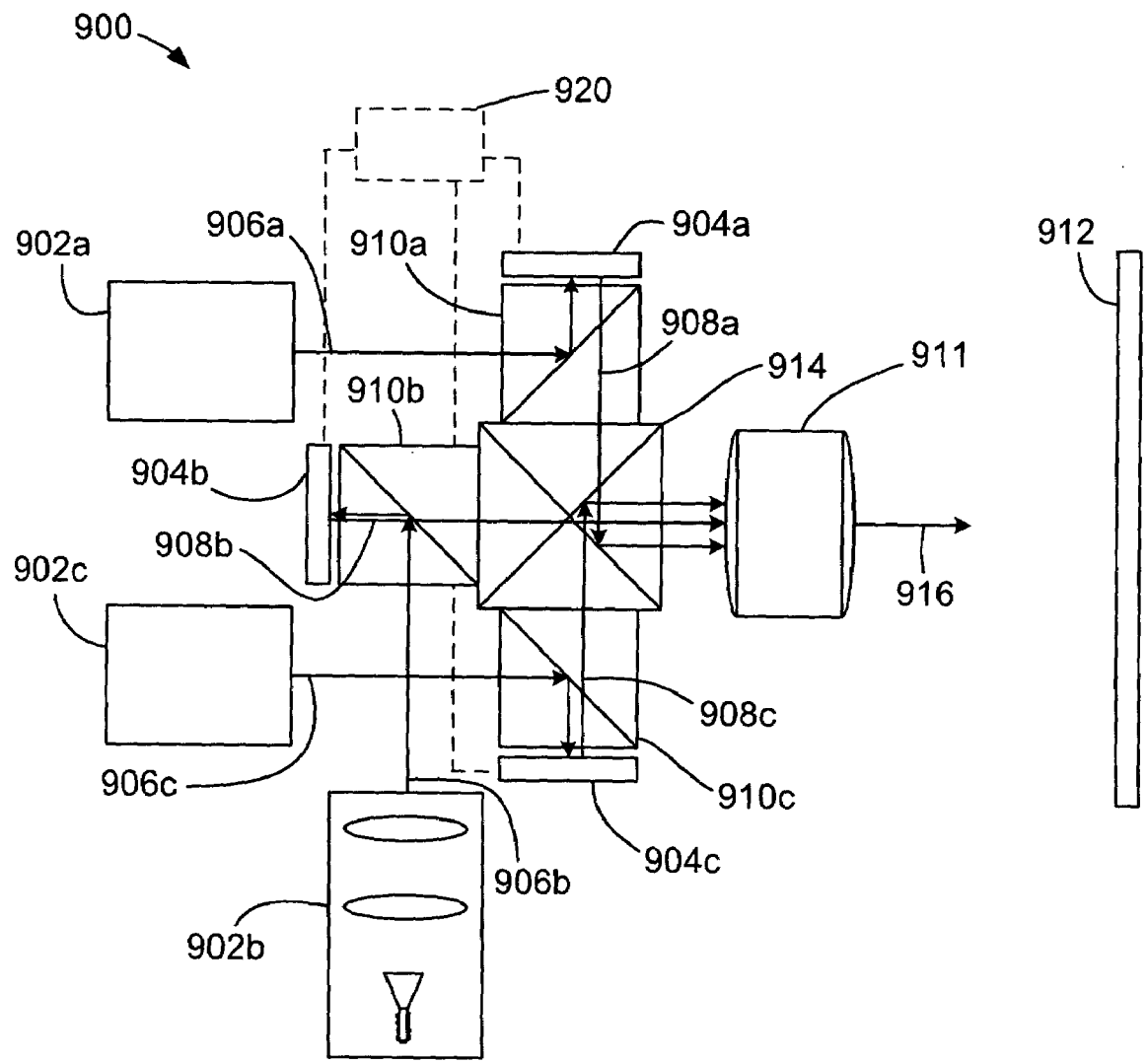
FIG. 9 schematically illustrates an embodiment of a projection system that uses a volume fluorescent light unit according to principles of the present invention.

An exemplary embodiment of a projection system that might use a volume fluorescent light unit as described herein is schematically illustrated in FIG. 9. In this particular embodiment, the projection system 900 is a three-panel projection system, having light sources 902a, 902b, 902c that generate differently colored illumination light beams 906a, 906b, 906c, for example red, green and blue light beams. In the illustrated embodiment, the green light source 902b, includes a volume fluorescent light unit. However, any, or all of the light source 902a, 902b, 902c may include volume fluorescent light units. The light sources 902a, 902b, 902c may also include beam steering elements, for example mirrors or prisms, to steer any of the colored illumination light beams 906a, 906b, 906c to their respective image-forming devices 904a, 904b, 904c.

The image-forming devices 904a, 904b, 904c may be any kind of image-forming device. For example, the image-forming devices 904a, 904b, 904c may be transmissive or reflective image-forming devices. Liquid crystal display (LCD) panels, both transmissive and reflective, may be used as image-forming devices. One example of a suitable type of transmissive LCD image-forming panel is a high temperature polysilicon (HTPS) LCD. An example of a suitable type of reflective LCD panel is the liquid crystal on silicon (LCoS) panel. The LCD panels modulate an illumination light beam by polarization modulating light associated with selected pixels, and then separating the modulated light from the unmodulated light using a polarizer. Another type of image-forming device, referred to a digital multimirror device (DMD), and supplied by Texas Instruments, Piano, Tex., under the brand name DLP™, uses an array of individually addressable mirrors, which either deflect the illumination light towards the projection lens or away from the projection lens. In the illustrated embodiment, the image-forming devices 904a, 904b, 904c are of the LCoS type.

The light sources 902a, 902b, 902c may also include various elements such as polarizers, integrators, lenses, mirrors and the like for dressing the illumination light beams 906a, 906b, 906c.

The colored illumination light beams 906a, 906b, 906c are directed to their respective image forming devices 904a, 904b and 904c via respective polarizing beamsplitters (PBSs) 910a, 910b and 910c. The image-forming devices 904a, 904b and 904c polarization modulate the incident illumination light beams 906a, 906b and 906c so that the respective, reflected, colored image light beams 908a, 908b and 908c are separated by the PBSs 910a, 910b and 910c and pass to the color combiner unit 914. The colored image light beams 908a, 908b and 908c may be combined into a single, full color image beam 916 that is projected by a projection lens unit 911 to the screen 912.

The image-forming devices 904a, 904b, 904c may be coupled to a controller 920 (dashed lines) that controls the image displayed on the screen 912. The controller may be, for example, the tuning and image control circuit of a television, a computer or the like.

In the illustrated exemplary embodiment, the colored illumination light beams 904a, 906b, 906c are reflected by the PBSs 910a, 910b and 910c to the image-forming devices 904a, 904b and 904c and the resulting image light beams 908a, 908b and 908c are transmitted through the PBSs 910a, 910b and 910c. In another approach, not illustrated, the illumination light may be transmitted through the PBSs to the image-forming devices, while the image light is reflected by the PBSs.

Other embodiments of projection systems may use a different number of image-forming devices, either a greater or smaller number. Some embodiments of projection systems use a single image-forming device while other embodiments employ two image-forming devices. For example, projection systems using a single image-forming device are discussed in more detail in co-owned U.S. patent application Ser. No. 10/895,705 and projection systems using two image-forming devices are described in co-owned U.S. patent application Ser. No. 10/914,596, both of which are incorporated herein by reference. In a single panel projection system, the illumination light is incident on only a single image-forming panel. The incident light is modulated, so that light of only one color is incident on a part of the image-forming device at any one time. As time progresses, the color of the light incident on the image-forming device changes, for example, from red to green to blue and back to red, at which point the cycle repeats. This is often referred to as a "field sequential color" mode of operation. In other types of single panel projection systems, differently colored bands of light may be scrolled across the single panel, so that the panel is illuminated by the illumination system with more than one color at any one time, although any particular point on the panel is instantaneously illuminated with only a single color.

In a two-panel projection system, two colors are directed sequentially to a first image-forming device panel that sequentially displays an image for the two colors. The second panel is typically illuminated continuously by light of the third color. The image beams from the first and second panels are combined and projected. The viewer sees a full color image, due to integration in the eye.

EXAMPLE

Figure 10A:
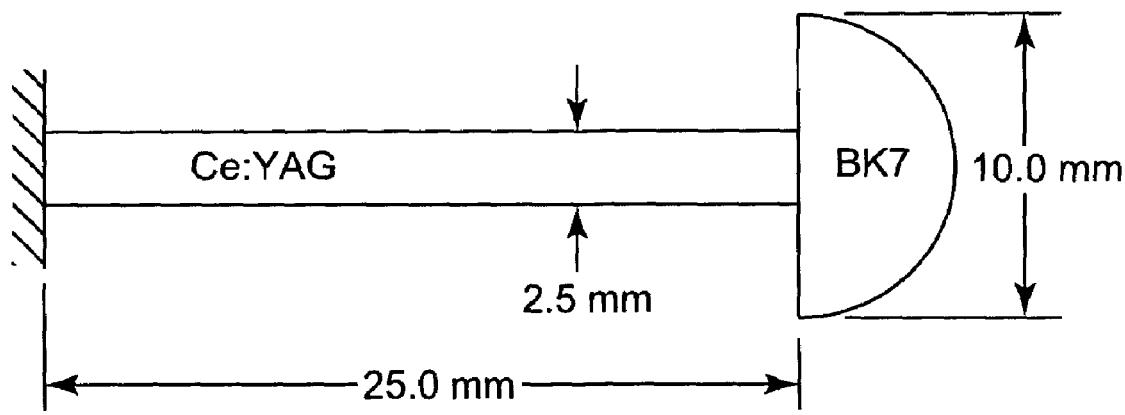
FIGS. 10A and 10B schematically illustrate an experimental fluorescent body.
Figure 10B:
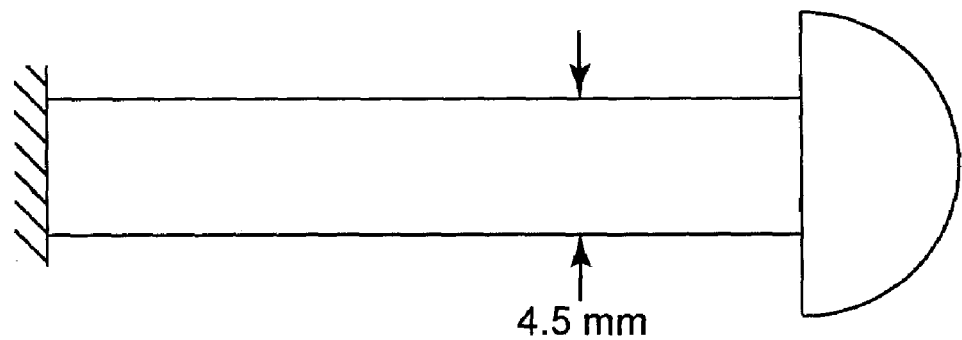

An experimental volume fluorescent light unit, shown schematically in FIGS. 10A and 10B, was fabricated and tested. The fluorescent body was formed of a slab of single crystal yttrium aluminum garnet (YAG) doped with 0.18% Ce. The dimensions of the body were 2.5 mm thick, 4.5 mm wide and 25 mm long. All six sides were polished. A standard enhanced aluminum mirror was glued to one of the 2.5 mm by 4.5 mm faces, the rear face, using a UV cure optical adhesive. For some of the measurements, a 10 mm diameter BK7 half-ball lens was glued to the other 2.5 mm by 4.5 mm face, the extraction face, to improve light extraction.

The pump light was provided to the body by one or more Luxeon III Royal Blue LEDs, type LHXL-PR09, supplied by Lumileds Inc., San Jose, Calif.

1. Single Pump LED

Figure 11:
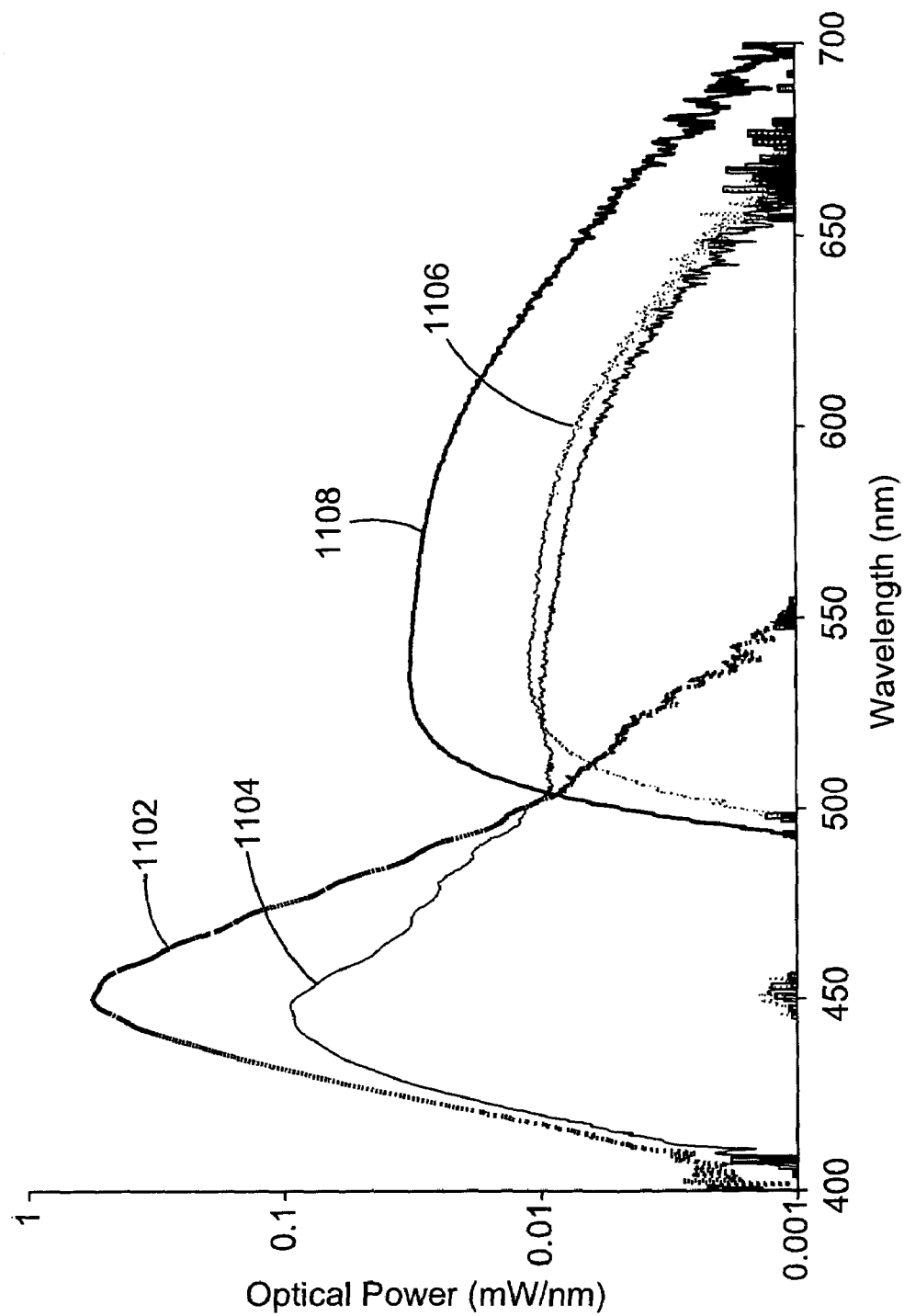
FIG. 11 shows a graph of various spectra of pump light and volume fluorescent light obtained from the experimental fluorescent body of FIGS. 10A and 10B.

The light from a single LED was relayed using a single focusing optic to image the LED active area on the large (4.5 mm by 25 mm) side of the slab. The optical power delivered to the slab from the LED assembly was calibrated using an aperture on the entrance port of an integrating sphere that was the same size as the large side of the slab (4.5 mm by 25 mm). The optical power out of a single LED is shown plotted as a function of wavelength as curve 1102 in FIG. 11. Next, the amount of pump light that was transmitted through the body was measured by placing the body between the LED and the integrating sphere: about 25% of the blue light (<500 nm) from the LED was transmitted into the sphere. The blue pump light transmitted through the body is shown as curve 1104 in FIG. 11. Accounting for the Fresnel reflection on the surfaces of the body, it is estimated that 67% of the incident pump light was absorbed in the body. This fraction may be increased by increasing the doping concentration of the Ce in the body, or by making the body thicker.

The fluorescent light exiting out of the extraction face of the body, without the lens attached, was measured using the integrating sphere with the pump light incident on the large face of the body. The fluorescent light (>500 nm) collected by the sphere was 8.1% of the incident optical power of the blue light from the LED when the LED light was incident near the mirror end of the slab and 8.4% when the LED light was incident at the center of the slab. Curve 1106 shows the fluorescent light extracted from the body when pumped by a single LED. It should be understood that the values of wavelength discussed here for the fluorescent light and the pump light are presented as the wavelength in vacuo. Furthermore, it is noted that curves 1106 and 1108 partially overlap curve 1102, although the wavelength ranges, defined as full width, half maximum (FWHM) ranges, are different for pump and fluorescent light.

The fluorescent output from the body was also measured after attaching the BK7 half-ball lens to the extraction face of the body: the results are shown in curve 1108. In this case, 22.2% of the pump light was extracted as fluorescent light.

The total conversion efficiency, $\eta_{total}$, can be approximated as the product of three efficiencies, pump absorption, $\theta_{abs}$, Stokes conversion, $\eta_{Stokes}$, and fluorescent light extraction, $\eta_{extraction}$. Another factor, the quantum efficiency, i.e. the fraction of excited fluorescent species that actually produce a fluorescent photon, has been ignored in this example, because the quantum efficiency of Ce:YAG is very close to unity. The pump absorption was measured directly, as described above. The Stokes efficiency can be calculated to be about 80% from the measured fluorescence spectrum. The fluorescent light extraction efficiency, $\eta_{extraction}$, can then be calculated because all the other terms are known, as follows:

$$\eta_{extraction} = \eta_{total}/(\eta_{abs} \cdot \eta_{Stokes}) = 1.86 \, \eta_{total}$$

The comparison between the fluorescent light extraction efficiency, $\eta_{extraction}$, that was measured in this experiment and the theoretical values discussed earlier is shown in Table I, below. The efficiencies are listed with the lens output extractor (lens o/e) and without the output extractor (bare end).

TABLE I

Optical Power vs. Wavelength for Various Test Conditions

|  | bare end | lens o/e |
|---|---|---|
| Measured total efficiency, $\eta_{total}$ | 8.1% | 22.2% |
| Measured extraction efficiency, $\eta_{extraction}$ | 15.3% | 41.9% |
| Theoretical extraction efficiency, $\eta_{extraction}$ | 16.3% | 44.0% |

The experimental results are lower than the theoretical values by just a few percent. The small discrepancy can be explained by imperfect reflection from the mirror, scatter losses at the surfaces and Fresnel reflections from the ball-lens. Nonetheless, the close agreement justifies confidence in the description of fluorescent extraction provided above.

2. Multiple LED Pumps

A second experiment was set up using six Luxeon III Royal Blue LEDs to pump the body, with three LEDs pumping each of the 25 mm×4.5 mm faces. The LEDs were arranged in a line and no intermediate optics were used: the domes of the LEDs were brought to within 1 mm of the body. In order from the mirror end to the half-ball lens end, one side had LEDs numbered 1, 3, 5 and the other side had LEDs 2, 4 and 6, thus LED pairs 1/2, 3/4, 5/6 faced each other through the body. First, each LED was run individually at 1A, and the fluorescent light exiting the slab through the half-ball lens was collected using the integrating sphere (Runs 1-6). Next, all three LEDs on each side, namely LEDs 1, 3, and 5 and LEDs 2, 4, and 6, were run together (Runs 7 and 8). Lastly, all six LEDs were run together (Run 9).

Figure 12:
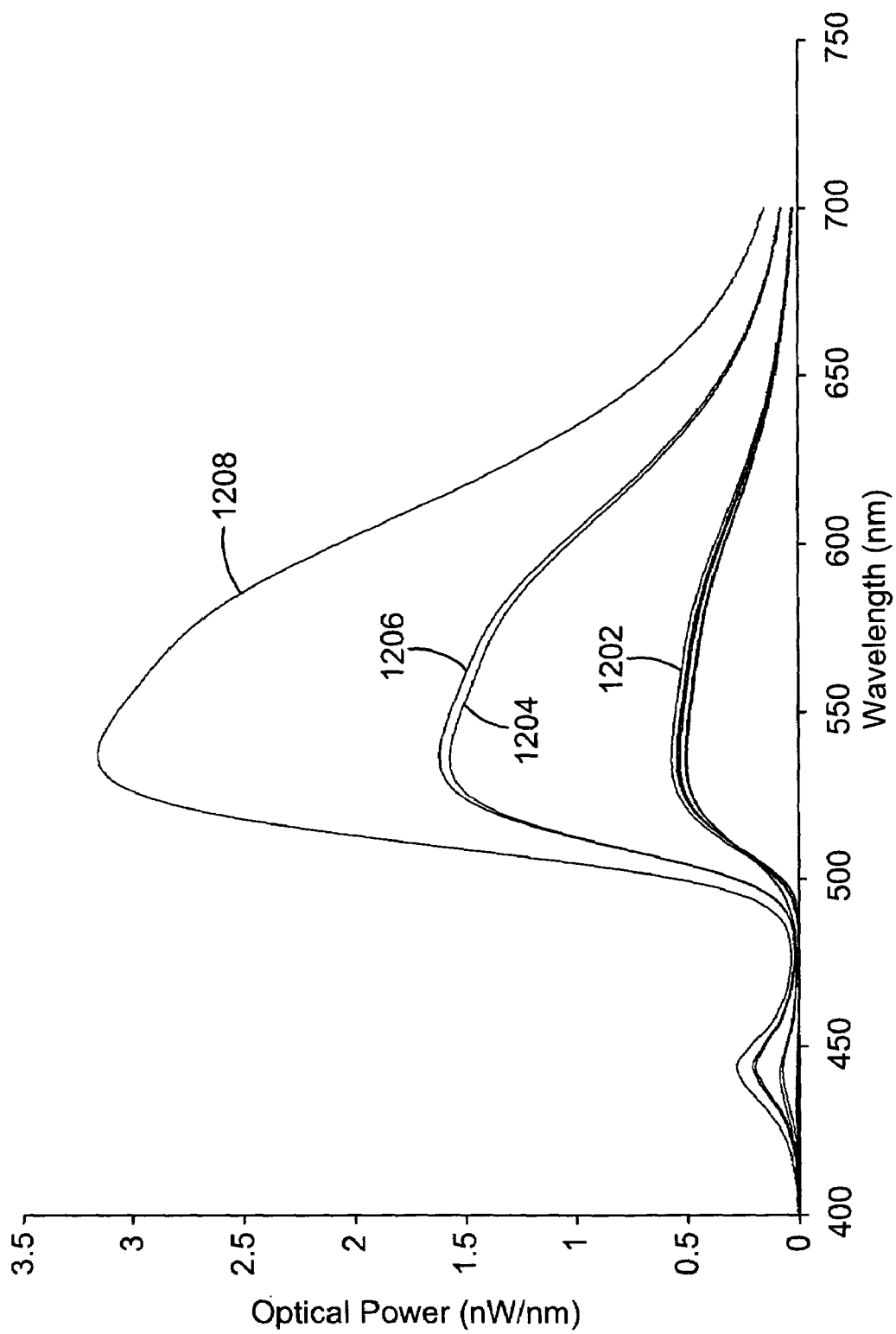
FIG. 12 shows a graph of fluorescent output from the experimental fluorescent body under different pumping conditions.

The spectral results are for these nine runs are shown in FIG. 12. Curve 1202 is actually the overlap of six similar curves, corresponding to runs 1-6, showing that the amount of fluorescent light generated by each LED individually is approximately equal. Curves 1204, 1206 and 1208 correspond to runs 7-9 respectively.

The output power increases proportionally with increased pump power and showed no saturation when all the LEDs were run together. Table II presents the optical power measured in the fluorescence band (>500 nm) for each LED run individually and for the groups run together. There is less than 1% difference between the sums of the individual measurements and the result attained with all LEDs operating simultaneously.

TABLE II

Fluorescent Output Power (>500 nm) for Individual LEDs and LEDs run Together

| Individual LED pumping | Optical Power (>500 nm (mW) |
|---|---|
| LED #1 | 58.5 |
| LED #2 | 59.2 |
| LED #3 | 57.7 |
| LED #4 | 61.9 |
| LED #5 | 54.7 |
| LED #6 | 55.5 |

| Multi-LED pumping | Measured together | Sum of individual (above) |
|---|---|---|
| LED #1, 3, 5 | 171.4 | 170.9 |
| LED #2, 4, 6 | 176.7 | 176.6 |
| LED # 1-6 | 345.1 | 347.5 |

With all six LEDs operating at 1A, the fluorescent output was about 168 lumens. As an additional check, the light from the LED groups was measured in transmission through a 4.5 mm by 25 mm aperture to mimic the slab. The power transmitted through the aperture was 735 mW for LEDs 1,3 and 5 together and 856 mW for LEDs 2,4 and 6 together. Thus, the total blue light incident on the slab was estimated to be 1591 mW, of which 345 mW of fluorescent light was extracted, which is 22% efficiency, which matches the results from the single LED pump.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. An illumination system, comprising:
   at least a first source of incoherent light capable of generating light in a first wavelength range;
   a body containing a fluorescent material that emits light in a second wavelength range, different from the first wavelength range, when illuminated by light in the first wavelength range;
   the body having an extraction area, at least some of the light at the second wavelength being internally reflected within the body to the extraction area, light at the second wavelength exiting the extraction area in a direction substantially perpendicular to a direction at which the light at the first wavelength is substantially incident on the body; and the body comprising a material having a mean free path for light in the second wavelength range of at least twice the length of the body.

2. A system as recited in claim 1, wherein the at least a first source of incoherent light comprises a first source and at least a second source.

3. A system as recited in claim 2, wherein the first and second sources are disposed on different sides of the body.

4. A system as recited in claim 1, wherein the first light source is a light emitting diode (LED).

5. A system as recited in claim 4, wherein the LED is disposed on a reflecting substrate.

6. A system as recited in claim 4, wherein the at least a first light source comprises a plurality of LEDs capable of emitting light in the first wavelength range, the first wavelength range being between about 400 nm and about 500 nm, and the second wavelength range lies between about 500 nm and about 600 nm.

7. A system as recited in claim 1, wherein the body has a rear face opposing the extraction area, the rear face having an area substantially equal to the area of the extraction area.

8. A system as recited in claim 1, wherein the body has a rear face opposing the extraction area, an area of the rear face being smaller than the area of the extraction area.

9. A system as recited in claim 8, wherein the body has side walls extending between the rear face and the extraction area, the side walls being substantially straight.

10. A system as recited in claim 1, wherein the body has a rear face opposing the extraction area and sidewalls adjacent the rear face, the rear face being non-orthogonal to the sidewalls.

11. A system as recited in claim 1, further comprising an output extractor disposed at the extraction area, the output extractor being optically coupled to extract the light in the second wavelength range out of the body.

12. A system as recited in claim 11, wherein the output extractor comprises a lens coupled to the body.

13. A system as recited in claim 11, wherein the output extractor is a tapered tunnel coupled to the body.

14. A system as recited in claim 11, wherein the output extractor is formed of the same material as the body and is formed integrally with the body.

15. A system as recited in claim 11, wherein the output extractor comprises an output surface that is non-perpendicular to a longitudinal axis of the body.

16. A system as recited in claim 1, wherein a reflective layer is provided on at least one surface of the body.

17. A system as recited in claim 16, wherein the reflective layer is substantially transparent to light in the first wavelength range and substantially reflects light in the second wavelength range.

18. A system as recited in claim 1, further comprising a reflective polarizer disposed in light path of light in the second wavelength range that has transmitted out of the extraction area.

19. A system as recited in claim 18, further comprising a polarization conversion element disposed between the extraction area and the reflective polarizer.

20. A system as recited in claim 18, further comprising an output extractor disposed between the extraction area and the reflective polarizer.

21. A system as recited in claim 1, wherein the body has a length L and a height, h, wherein the fraction of light scattered when totally internally reflecting at the surface of the body is less than 5%/(2L/h).

22. A system as recited in claim 1, wherein the second wavelength range contains longer wavelengths than the first wavelength range.

23. A system as recited in claim 1, further comprising a projection unit comprising at least one image-forming device, a projection lens unit and a screen, light in the second wavelength range illuminating the at least one image-forming device, image light from the at least one image forming device being projected by the projection lens unit to the screen.

24. A system as recited in claim 23, further comprising a controller coupled to control an image formed by the at least one image-forming device.

25. A system as recited in claim 1, wherein the body comprises fluorescing material disposed in a transparent material, the fluorescing material comprising at least one of a rare-earth metal ion, a transition metal ion and an organic fluorescent dye.

26. A system as recited in claim 1, wherein the body comprises fluorescing material disposed in a transparent material, the transparent material comprising one of an inorganic crystal, a glass and polymer matrix.

27. An illumination system capable of producing a beam of illumination light, comprising:
  a body containing fluorescent material, the body having at least one pump area and a light extraction area;
  at least one light emitting diode (LED) capable of generating light at a first wavelength substantially in a first direction, at least some of the light at the first wavelength passing through the at least one pump area into the body, fluorescent light at a second wavelength being generated in the body following absorption of the light at the first wavelength, at least some of the light at the second wavelength being directed by total internal reflection within the body towards the light extraction area, at least some of the light of the second wavelength passing through the light extraction area as the beam of illumination light substantially in a second direction non-parallel to the first direction; and
  the body comprising a material having a mean free path for light at the second wavelength of at least twice the length of the body.

28. A system as recited in claim 27, wherein the at least one LED is disposed on a reflecting substrate.

29. A system as recited in claim 27, wherein the at least one LED comprises a plurality of LEDs disposed to emit light at the first wavelength through the pump area of the body.

30. A system as recited in claim 29, wherein the first wavelength has a value in the range between about 400 nm and about 500 nm, and the second wavelength has a value in the range between about 500 nm and about 600 nm.

31. A system as recited in claim 27, wherein the body has a rear face opposing the extraction area, the rear face having an area substantially equal to the area of the extraction area.

32. A system as recited in claim 27, wherein the body has a rear face opposing the light extraction area, an area of the rear face being smaller than the area of the extraction area.

33. A system as recited in claim 32, wherein the body has side walls extending between the rear face and the extraction area, the side walls being substantially straight.

34. A system as recited in claim 27, wherein the body comprises a rear face opposing the extraction area and sidewalls extending between the rear face and the light extraction area, the rear face being non-orthogonal to the sidewalls.

35. A system as recited in claim 27, further comprising an output extractor disposed at the extraction area, the output extractor being optically coupled to extract the light in the second wavelength range out of the body.

36. A system as recited in claim 35, wherein the output extractor comprises a lens coupled to the body.

37. A system as recited in claim 35, wherein the output extractor comprises a tapered tunnel coupled to the body.

38. A system as recited in claim 35, wherein the output extractor is formed of the same material as the body and is formed integrally with the body.

39. A system as recited in claim 35, wherein the output extractor comprises an output surface that is non-perpendicular to a longitudinal axis of the body.

40. A system as recited in claim 27, wherein a reflective layer is provided on at least one surface of the body.

41. A system as recited in claim 40, wherein the reflective layer is substantially transparent to light at the first wavelength and substantially reflects light at the second wavelength.

42. A system as recited in claim 27, further comprising a reflective polarizer disposed in a light path for light of the second wavelength that has transmitted out of the extraction area.

43. A system as recited in claim 42, further comprising a polarization conversion element disposed between the extraction area and the reflective polarizer.

44. A system as recited in claim 42, further comprising an output extractor disposed between the extraction area and the reflective polarizer.

45. A system as recited in claim 27, wherein the body has a length L and a height, h, wherein the fraction of light scattered when totally internally reflecting at the surface of the body is less than 5% (2L/h).

46. A system as recited in claim 27, wherein the second wavelength is longer than the first wavelength.

47. A system as recited in claim 27, further comprising a projection unit comprising at least one image-forming device, a projection lens unit and a screen, light at the second wavelength illuminating the at least one image-forming device, image light from the at least one image forming device being projected by the projection lens unit to the screen.

48. A system as recited in claim 47, further comprising a controller coupled to control an image formed by the at least one image-forming device.

49. A system as recited in claim 27, wherein the body comprises fluorescing material in a transparent material, the fluorescing material comprising at least one of a rare-earth metal ion, a transition metal ion and an organic fluorescent dye.

50. A system as recited in claim 27, wherein the body comprises a fluorescing material disposed in a transparent material, the transparent material comprising one of an inorganic crystal, a glass and polymer matrix.

51. A system as recited in claim 27, wherein light passing out of the light extraction area at the second wavelength has a higher brightness than the brightness of the first wavelength light passing in through the at least one pump area.

\* \* \* \* \*

UNITED STATES PATENT AND TRADEMARK OFFICE
CERTIFICATE OF CORRECTION

PATENT NO. : 7,316,497 B2
APPLICATION NO. : 11/092284
DATED : January 8, 2008
INVENTOR(S) : Todd S. Rutherford Page 1 of 1

It is certified that error appears in the above-identified patent and that said Letters Patent is hereby corrected as shown below:

Column 9
Line 44 (approx.), delete "DLPT™," and insert -- DLP™ --, therefor.

Column 15
Line 14 (approx.), delete "$\theta_{abs}$," and insert -- $\eta_{abs}$, --, therefor.

Signed and Sealed this

Twenty-second Day of July, 2008

JON W. DUDAS
*Director of the United States Patent and Trademark Office*